J. I. DOMINGUEZ.
CATTLE GUARD.
APPLICATION FILED JAN. 21, 1920.
1,345,146.
Patented June 29, 1920.
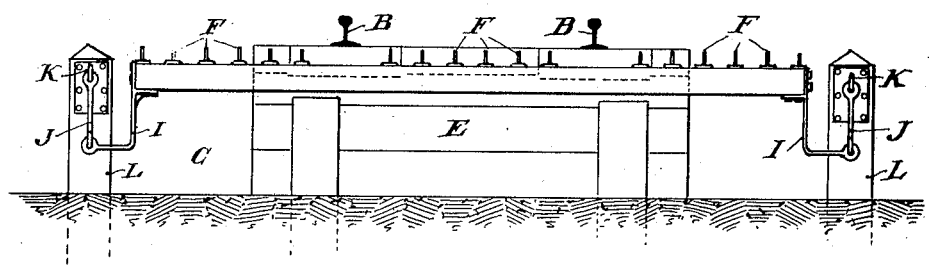
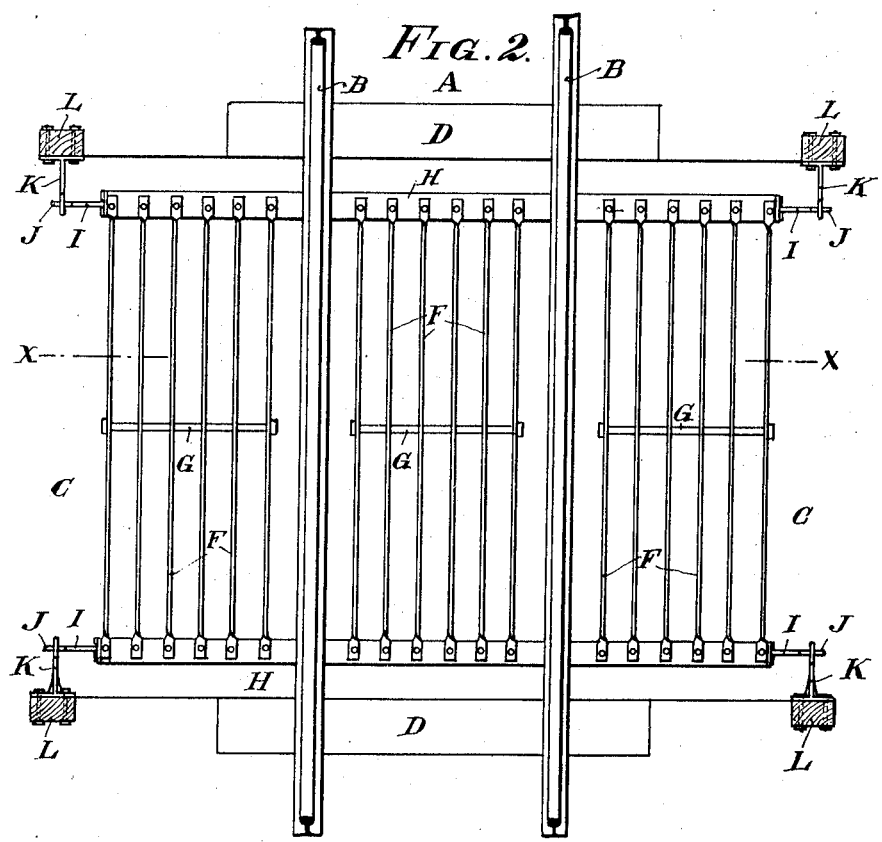
INVENTOR
JUAN ISMAEL DOMINGUEZ
BY
ATTORNEYS.

UNITED STATES PATENT OFFICE.

JUAN ISMAEL DOMINGUEZ, OF BUENOS AIRES, ARGENTINA.

CATTLE-GUARD.

1,345,146.  Specification of Letters Patent.  Patented June 29, 1920.

Application filed January 21, 1920. Serial No. 352,971.

*To all whom it may concern:*

Be it known that I, JUAN ISMAEL DOMINGUEZ, a citizen of the Argentine Republic, residing at Calle Maipú 671, Buenos Aires, Argentina, have invented new and useful Improvements in Cattle-Guards, of which the following is a specification.

This invention relates to a novel device for preventing cattle or the like from entering the tracks of railways by the openings left at the level crossings.

Heretofore, no satisfactory results have been obtained by the devices used for intercepting the entrance of animals into the private part of the tracks, as horses or cattle may continually be found grazing thereon which besides the loss of their own value when hurt or killed by collision, constitute a serious danger as they may cause a train to derail.

A device now generally adopted in railways for preventing the access of animals to the tracks is a sort of grate, that is to say, at each side of the level crossing a trench is dug out which is then covered by a fixed grate, placed at a certain level.

In connection with this system, the animals will gradually learn to pass by the same, either by walking in equilibrium on one of the bars of the grate, or by treading with their feet separated on two of said bars and will readily succeed in doing so as said grates are rather prominent and fixed, so as to offer a good point of support.

As will presently be seen, I have devised a novel intercepting apparatus, also based on a grate, but so held in suspension that the same may shift or oscillate in any directions. By this arrangement, besides the advantages inherent to the ordinary grate, I obtain full security that animals will not succeed in passing by the grate, however often they may intend to do so, as when simply stepping with a foot thereon, the grate will at once shift or oscillate in one or the other direction, so as to cause the animal to lose equilibrium and get frightened by the movement of the grate, whereupon the animal will withdraw therefrom.

For the better understanding of the specification, the same should be considered in connection with the accompanying drawings, in which:

Figure 1 represents a sectional elevation taken along the line X—X of Fig. 2, while Fig. 2 is an upper plan view of a cattle intercepting device, constructed in accordance with my invention.

In said drawings, A indicates the level crossing and B the rails of the track, supported at the edges of the trench C by the sleepers D, placed in position in combination with the boards E which constitute a lateral lining of the trench. The intercepting means, formed by the bars F are placed after the manner of a grate on top of the trench being connected together at their middle part by means of bolts and spacing tubes G, while at their ends the bars F are firmly secured to the beams H. These latter, by means of the arms I, links J and the brackets K of the standards L, are suspended so as to be able to freely oscillate.

Owing to this arrangement, the beams H together with the bars F form a grated surface, adapted to horizontally shift or move in any direction, on account of its separation from the edges of the trench and the means employed for suspending the grate.

It will be readily understood that as an animal tries to step on the grate in order to pass by the same, such intercepting means will at once shift or oscillate in one direction or the other, thereby preventing the animal from stepping forward.

In the drawings, the intercepting device has been shown as applied to a single track but it will be evident, that the same may also conveniently be used by applying any number thereof to multiple tracks.

I now declare that what I claim as new and desire to secure by Letters Patent, is;—

1. In a cattle guard for a railroad track, a pair of posts arranged on each side of the track, a grating extending under the track and formed of beams and spaced bars connecting the beams, angular arms on the ends of the beams, brackets on the posts, and links pivoted to the said brackets and arms.

2. In a cattle guard, a grating formed of beams and bars connecting the beams, an angular arm on each end of each beam, brackets adapted to be secured to fixed supports, and links pivoted to the said brackets and arms.

JUAN ISMAEL DOMINGUEZ.

Witnesses:
  A. L. BELLO,
  ROSENDO RAMON.